US008569904B2

(12) United States Patent
Gundtoft et al.

(10) Patent No.: US 8,569,904 B2
(45) Date of Patent: Oct. 29, 2013

(54) METHOD FOR CONTROLLING A WIND TURBINE AT HIGH THERMAL LOADS

(75) Inventors: Soeren Gundtoft, Frederica (DK); Henrik Stiesdal, Odense C (DK)

(73) Assignee: Siemens Aktiengesellschaft, München (DE)

( * ) Notice: Subject to any disclaimer, the term of this patent is extended or adjusted under 35 U.S.C. 154(b) by 367 days.

(21) Appl. No.: 12/897,032

(22) Filed: Oct. 4, 2010

(65) Prior Publication Data

US 2011/0080001 A1  Apr. 7, 2011

(30) Foreign Application Priority Data

Oct. 6, 2009  (EP) .................................... 09012655

(51) Int. Cl.
*F03D 9/00* (2006.01)
*H02P 9/04* (2006.01)

(52) U.S. Cl.
USPC .......................................................... 290/44

(58) Field of Classification Search
USPC .......................................................... 290/44
See application file for complete search history.

(56) References Cited

U.S. PATENT DOCUMENTS

| | | | | |
|---|---|---|---|---|
| 2,106,557 A | | 1/1938 | Putnam | 290/44 |
| 7,476,985 B2 * | | 1/2009 | Llorente Gonzalez | 290/44 |
| 7,834,472 B2 * | | 11/2010 | Rebsdorf et al. | 290/44 |
| 7,837,126 B2 * | | 11/2010 | Gao | 236/44 C |
| 7,963,740 B2 * | | 6/2011 | Larsen et al. | 415/4.3 |
| 8,052,383 B2 * | | 11/2011 | Frokjaer | 415/178 |
| 8,368,239 B2 * | | 2/2013 | Letas | 290/44 |
| 8,390,140 B2 * | | 3/2013 | Bolln et al. | 290/44 |
| 8,400,003 B2 * | | 3/2013 | Letas et al. | 290/44 |
| 8,442,778 B2 * | | 5/2013 | Bechhoefer et al. | 702/34 |
| 2006/0214428 A1 * | | 9/2006 | Altemark et al. | 290/44 |
| 2006/0273595 A1 * | | 12/2006 | Avagliano et al. | 290/44 |
| 2007/0018457 A1 * | | 1/2007 | Llorente Gonzalez | 290/44 |
| 2008/0298964 A1 * | | 12/2008 | Rimmen | 416/39 |
| 2009/0212560 A1 * | | 8/2009 | Larsen | 290/2 |
| 2009/0212575 A1 * | | 8/2009 | Larsen et al. | 290/55 |
| 2010/0008776 A1 * | | 1/2010 | Larsen et al. | 416/39 |
| 2010/0034653 A1 * | | 2/2010 | Frokjaer | 416/39 |
| 2010/0133824 A1 * | | 6/2010 | Gao | 290/44 |
| 2010/0140938 A1 * | | 6/2010 | Cook | 290/44 |
| 2010/0270798 A1 * | | 10/2010 | Poulsen et al. | 290/44 |
| 2010/0298995 A1 * | | 11/2010 | Zhang et al. | 700/287 |
| 2010/0314875 A1 * | | 12/2010 | Grant | 290/44 |
| 2011/0049887 A1 * | | 3/2011 | Milo | 290/44 |
| 2011/0081226 A1 * | | 4/2011 | Wobben | 415/1 |
| 2011/0133457 A1 * | | 6/2011 | Hoffmann et al. | 290/44 |
| 2011/0133458 A1 * | | 6/2011 | Harrison et al. | 290/44 |

(Continued)

FOREIGN PATENT DOCUMENTS

| | | | |
|---|---|---|---|
| DE | 3342583 A1 | 6/1985 | |
| DE | 202009003376 U1 | 6/2009 | |

(Continued)

*Primary Examiner* — Pedro J Cuevas

(57) ABSTRACT

A method of controlling a temperature of a component of a wind turbine is disclosed. A set point temperature of the component is defined. The actual temperature of the component is determined and compared with the defined set point temperature. The actual temperature of the component is controlled by controlling the output power of the wind turbine based on the result of comparison.

11 Claims, 3 Drawing Sheets

(56) References Cited

U.S. PATENT DOCUMENTS

| | | | |
|---|---|---|---|
| 2012/0133152 A1* | 5/2012 | Wagoner et al. | 290/1 B |
| 2012/0148407 A1* | 6/2012 | Akashi et al. | 416/95 |
| 2012/0156053 A1* | 6/2012 | Stiesdal | 416/93 R |
| 2012/0235421 A1* | 9/2012 | Wong et al. | 290/55 |
| 2012/0280511 A1* | 11/2012 | Eriksen | 290/55 |
| 2012/0282096 A1* | 11/2012 | Eriksen et al. | 416/95 |
| 2013/0015662 A1* | 1/2013 | Bertolotti et al. | 290/44 |
| 2013/0056989 A1* | 3/2013 | Sabhapathy | 290/55 |

FOREIGN PATENT DOCUMENTS

| | | |
|---|---|---|
| EP | 1918581 A2 | 5/2008 |
| EP | 2060786 A2 | 5/2009 |
| JP | 59150982 A | 8/1984 |
| JP | 7087798 A | 3/1995 |
| SE | 427765 B | 5/1983 |
| WO | WO 2005015012 A1 | 2/2005 |
| WO | WO 2007051464 A1 | 5/2007 |
| WO | WO 2009003478 A2 | 1/2009 |
| WO | WO 2009076955 A1 | 6/2009 |

\* cited by examiner

METHOD FOR CONTROLLING A WIND TURBINE AT HIGH THERMAL LOADS

CROSS REFERENCE TO RELATED APPLICATIONS

This application claims priority of European Patent Office application No. 09012655.8 EP filed Oct. 6, 2009, which is incorporated by reference herein in its entirety.

FIELD OF INVENTION

The present invention relates to a method of controlling a temperature of a component of a wind turbine, a controlling device for controlling a temperature of a component of a wind turbine, a wind turbine and a computer program for controlling the temperature of a component of a wind turbine.

ART BACKGROUND

Conventional components of wind turbines such as electrical machines, power converters, key boxes and etc. need to be cooled in order to dissipate the heat generated during operation. The cooling systems have to be designed to generate a cooling power that keeps the temperature of the wind turbine components to be cooled below a predefined maximum component temperature.

The present design praxis of cooling systems for wind turbines is based on a specifically defined maximum allowable ambient air temperature that may be e.g. 35° C. or 40° C. The cooling system is designed to keep the temperature of relevant components under a predefined maximum component temperature even at maximum power output where heat dissipation arising as a result of mechanical and electrical losses is at its maximum.

If the maximum allowable ambient air temperature is exceeded and the turbine is running at maximum power output where heat dissipation arising as a result of mechanical and electrical losses is at its maximum, the cooling system may not be able to keep the temperature of the component under a predefined maximum component temperature. In this situation a suitable response is required.

EP 1 918 581 A2 uses the above-described ambient air temperature as control input. If the ambient air temperature exceeds the defined maximum allowable ambient air temperature the wind turbine is shut off in order to cool down and to prevent overheating of the components. Further parameters, such as the temperature of the components itself or the capacity of the cooling system are not taken into consideration.

Besides the ambient air temperature, the temperature of the components may also be affected by the amount of generated output power of the component, the wind speed, the cooling capacity of the cooling system and a variety of other parameters, such as a blockage of coolers by dust or insects, etc. In conventional cooling systems these parameters were not drawn sufficiently into consideration in order to provide an appropriate cooling for components of the wind turbines.

SUMMARY OF THE INVENTION

It is an object of the present invention to maintain a proper power output of a wind turbine under hot temperature conditions.

This object may be solved by a method of controlling the temperature of a component of a wind turbine, by a controlling device for controlling a temperature of a component of the wind turbine, by a wind turbine and by a computer program for controlling a temperature of a component of a wind turbine according to the independent claims.

According to a first exemplary embodiment the method of controlling a temperature of a component of a wind turbine is described. The method comprises defining a set point temperature of the component of the wind turbine. Moreover, the actual temperature of the component is determined. The defined set point temperature and the determined actual temperature are compared to each other. Next, according to the method, the actual temperature of the component is controlled by controlling the output power of the wind turbine based on the result of comparing the defined set point temperature and the determined actual temperature, so that the actual temperature of the component is kept below the set point temperature of the component.

According to a further exemplary embodiment, a controlling device for controlling the temperature of the component of the wind turbine is described. The controlling device comprises an input unit for defining a set point temperature of the component of the wind turbine. Moreover, the controlling device comprises a determining unit for determining the actual temperature of the component. The controlling device further comprises a comparing unit for comparing the defined set point temperature and the determined actual temperature. Moreover, the controlling device comprises a controlling unit for controlling the actual temperature of the component by controlling the output power of the wind turbine based on the result of comparing the defined set point temperature and the determined actual temperature, so that the actual temperature of the component is kept below the set point temperature of the component.

According to a further exemplary embodiment of the present invention a wind turbine is described, wherein the wind turbine comprises an above-described controlling device and a component.

Moreover, a computer program for controlling a temperature of the component of a wind turbine is described, wherein a computer program, when being executed by a data processor, is adapted for controlling the above-described method.

By the described method, an actual temperature of the component of the wind turbine may be (permanently) measured and compared to a predefined set point temperature of the component. When the actual temperature of the component reaches or exceeds the set point temperature the output power of the wind turbine is reduced, so that the actual temperature is kept below the set point temperature. Since the component temperature is normally related to the power output of the wind turbine, when reducing the output power of the wind turbine or in particular of the component itself, the temperature of the component may be reduced as well.

Thus, the controlling of the temperature of a component of a turbine is according to the present invention independent of the ambient temperature. The controlling of the temperature of the component may be directly dependent of the temperature of the component. Thus, by taking the temperature of the component as input parameter for the controlling method a proper controlling method may be provided. In particular, the temperature of the component is indicative of a variety of other parameters, such as the power generation, the wind speed, the cooling capacity of the cooling system and/or a blockage by the coolers by dust or insects.

By reducing the output power of the turbine in a controlled manner due to the component temperature, the wind turbine with its components will be able to handle extreme environment conditions, e.g. high ambient temperatures. This is in contrast to conventional wind turbines where the power generation of the wind turbine is shut off when the ambient temperature exceeds a predetermined set point for preventing an overheating of a component, or when the component temperature limit is exceeded. Thus, wind turbines that are controlled by the described control system according to the present invention may produce efficiently output power also when installed at hot sites where hot ambient temperatures exist. In conventional systems, when a high ambient temperature exists, the turbines have to be shut off even under high wind speeds, because a defined controlling of the component temperature is not possible. With the present invention the power production can be adapted to the component temperature and thus the wind turbine may produce at least a reduced output power and may thus use the wind energy even at hot sites.

According to a further exemplary embodiment, a maximum allowable output power of the wind turbine may be defined. Moreover, the actual output power is determined. The defined allowable output power and the determined actual output power are compared to each other. The actual output power may be further controlled by taking into account the result of comparing the defined allowable output power and the determined actual output power, so that the actual output power is kept below the maximum allowable output power. Thus, by the exemplary embodiment the output power may be controlled according to the actual temperature of the component on the one side and according to a maximum allowable output power on the other side. Thus, by the present invention a comprehensive control system may be provided that provides an effective power production with respect to the maximum allowable output power and the set point temperature of the component.

According to a further exemplary embodiment, the components may be selected from one of the group consisting of generators of the wind turbine and gearboxes of the wind turbine. In particular, the power generating components, such as the generator and the sub-components, such as the gearboxes of the wind turbine, increase its component temperature when producing a higher amount of output power. Thus, when regulating the output power due to the actual component temperature this may affect the temperature of the generator and the gearbox of the wind turbine.

According to a further exemplary embodiment, the output power of the wind turbine may be controlled by pitching a rotor blade of the wind turbine. Pitching a rotor blade means to rotate the rotor blade by an actuator around a longitudinal axis of the rotor blade, so that the rotor blade may be rotated in a first position for transferring the wind energy and mechanical energy or in a second position where the wind passes the rotor blade so that no wind energy is transferred into mechanical energy by the rotor blade. This may be an effective output power controlling without needing additional friction brake mechanics for example. Moreover, by pitching the rotor blade, an exact controlling of the output power may be achieved, and thus an exact controlling of the temperature of the component.

According to a further exemplary embodiment, a power control signal for controlling the operation of the component may be generated. The power control signal is indicative of the result of comparing the determined actual temperature and the defined set point temperature. The power control signal may comprise in particular a control value for controlling the power production of the component. For example, the power signal may be a value in the range between 0 and 1, wherein the value 0 leads to a shut off of the power production of the component and the value 1 leads to a maximum power production of the component. For instance, a value 0.1 or 0.2 provide a 10% or 20% power production of the component. The value of the power control signal may be determined by the comparison between the actual temperature and the set point temperature. In particular, if the actual component temperature exceeds the set point temperature, the control signal changes its value from 1 to 0.9 so that only 90% of output power is generated by the component. If the 90% power generation is enough for reducing the actual component temperature below the set point temperature, the power control signal may be kept by 0.9. If the actual temperature of the component stays still above the set point temperature, the power control signal may be reduced again until a value of the power control signal is set where the actual component temperature falls below the set point temperature. Thus, a controlled reduction of the output power is achieved and the maximum allowable value may be determined, i.e. where the actual component temperature is equal or below the set point temperature, so that always the maximum output power with respect to the component temperature may be generated. In conventional systems the output power of the component is reduced to zero until for example the ambient temperature is reduced again below a certain set point temperature of the ambient temperature. This leads to a waste of power production, wherein by the present exemplary embodiment even at high ambient temperatures and component temperatures power production is still possible, at least with a reduced power production.

According to a further exemplary embodiment, the output power of the wind turbine is controlled when (e.g. not till then) the actual component temperature has differed to the set point temperature for a predefined time period. According to the described embodiment, the actual temperature of the component may be above or below the predefined set point temperature for a predefined time period. For example, when the wind speed changes rapidly, also the output power of the component changes rapidly and thus also the temperature of the component changes rapidly and oscillates. Thus, when the temperature of the component exceeds only for a short time period the set point temperature, it may not be necessary to reduce the output power of the component for reducing the component temperature because damages of the component due to for example an overheat may not affect the lifetime or the quality of the component dramatically. Thus, a precipitately acting of the control and reduction of the output power may not be necessary. In particular, because it may be possible that in the predefined time period the temperature of the component already complies with the set point temperature again, so that a rapid change of the output power may not be necessary. Thus, if waiting a certain time period, unnecessary changes of the output power may be reduced, so that the overall power generation may not be affected hardly by the controlling system.

According to a further exemplary embodiment, the set point temperature is defined by a maximum allowable component temperature minus a predetermined safety temperature value. The maximum allowable component temperature may define the temperature upon the exceeding of this maximum allowable component temperature may lead to a failing of the component and thus of the wind turbine. When defining the set point temperature below a certain maximum allowable component temperature with the difference of the predetermined safety temperature value, the risk of overheating may be reduced.

According to a further exemplary embodiment, the controlling of the actual temperature of the component comprises the controlling of a cooling power of the cooling system by a cooling control signal. The cooling control signal is indicative of the actual temperature of the component. By the present exemplary embodiment besides the controlling of the power output as well the controlling of a cooling power of the cooling system may be used to cool the component. Therefore, a cooling control signal that is indicative of the actual temperature of the component is provided. For example, the value of the cooling control signal may be defined in a range between 0 and 1, wherein the value 0 may define that the cooling system is off and the value 1 may define that the cooling system runs at its maximal cooling capacity. For example, if the cooling control signal is 0,1, 10% of the cooling power may be generated.

According to a further exemplary embodiment, the determining the actual temperature of the component comprises measuring a cooling fluid temperature of the cooling system, wherein the cooling fluid temperature is indicative of the actual temperature of the component. The cooling fluid may flow generally in a cooling circuit to the component to be cooled and to a heat exchanger. If the cooling fluid passes the component, heat is absorbed by the cooling fluid, so that the component is cooled. When passing the heat exchanger, the cooling fluid is cooled again. From the temperature of the cooling fluid after passing the component, the component temperature may be determined. The more the component is heated up, the more the cooling fluid is heated up. By measuring the temperature of the cooling fluid it is not longer necessary to provide a temperature sensor at each component. Moreover, if the cooling circuit passes a plurality of components to be cooled, the temperature of the cooling fluid measured after passing the components may be indicative for the average temperature of each component.

According to a further exemplary embodiment, the controlling of the cooling power of the cooling system is carried out by the cooling control signal until a maximum cooling power is reached. The controlling of the output power of the wind turbine is carried out, if the cooling system is operated with a maximum cooling power and/or if the actual component temperature exceeds a predetermined temperature value. Thus, a comprehensive cooling system with two levels of cooling may be provided. In a first level, the power output may be constant also when the ambient temperature may be variable and in particular increases, so that the cooling system may cool the component only by controlling the cooling power or the cooling control signal respectively. When the maximum output power is reached and the ambient temperature is high, so that the component temperature exceeds a predetermined temperature value (e.g. the set point temperature of the component), the actual temperature of the component is controlled additionally or instead of the cooling system by controlling the output power of the component. Thus, a flexible cooling and control system may be provided that may be adapted to different operating levels for providing the appropriate cooling power and at the same time for providing the maximum possible output power with respect to the component temperature.

According to a further exemplary embodiment, the actual temperature of the component is kept constant by controlling the cooling power of the cooling system by the cooling control signal until a maximum cooling power is reached. Next, the actual temperature of the component is kept constant by controlling the output power of the wind turbine if the cooling system is operated with a maximum cooling power. Keeping the temperature of the component constant may extend the lifetime of the component, because no altering thermal expansion occurs which may lead to a fatigue of the material. For keeping the temperature of the component constant, a thermostat may be provided that controls the cooling system and the output power with respect to the component temperature.

Summarizing, the invention makes it possible to run a wind turbine in situations where the temperature of the component, such as a gearbox or the generator, reaches a defined maximum operational temperature limit. This may happen when the cooling system is running under full capacity and the ambient temperature is high. The output power of the wind turbine is hereby reduced instead of shutting off the wind turbine in order to keep the temperature of the component at or below a defined set point temperature of the component or keeping the temperature of the component constant at the defined set point temperature.

Such a situation could easily happen at sites where high ambient temperatures and high wind speeds are present at the same time. Due to the weight, the size and the costs of large cooling systems it may not be possible to cope all kinds of ambient temperatures. Thus, by using the inventive temperature control method and device it becomes possible to keep the turbine running (at least under reduced generation of output power) even when high ambient temperatures and high wind speeds are present at the same time. In conventional temperature control systems the wind turbines may have to be shut down when the ambient temperature exceeds a certain predefined temperature, so that the shutdown results in the total loss of production of power output in the period of standstill. By the present control system it is possible to keep the turbine running at least with a minimum power production.

Furthermore the invention makes is possible to design a cost optimized wind turbine and cooling system as the size of the cooling system can be reduced considerably by designing the cooling system to an ambient temperature which is lower than the maximum site temperature. However, the system would still be able to handle extreme temperatures since it is possible to control the temperature of the components (the generator, gearbox) by reducing the output power of the turbine in a controlled manner. In other words, the cooling of the components is not exclusively provided by controlling the cooling system but also by controlling the power generation.

Furthermore, analyses shown that turbines at hot sites operates at the combination of high temperature and high wind speed at the same time for relatively short periods of time during a season, so that the design of large and costintensive cooling systems may be unnecessary and a controlling of the output power for the high temperature seasons would be more efficient.

The (power generating) components in modern wind turbines, in particular the generators and the gearboxes, are large components comprising many tons weight and the thermal time constant is relatively long which gives a good opportunity to react on increasing temperatures of the generator. By measuring the component's temperature it becomes possible to take advantage of the long-time constant (e.g. the predefined time period as described above) as the ambient temperature might fall or the wind might calm down before the temperature of the component has reached its maximum operational temperature (e.g. set point temperature). This way, the long-time constant (predefined time period) is awaited before it becomes necessary to reduce the output power of the wind turbine, which is only possible if the temperature of the component itself is measured. In comparison by measuring only the ambient temperature as described in EP 1 918 581 A2 this is not possible because the temperature of the component is not an input parameter for the control system.

Moreover, the invention may take future climate changes into account. Today, turbines are normally designed for a lifetime of 20 years but the current climate changes makes it difficult to predict the future temperatures, in particular the ambient temperatures, and wind speeds at sites due to the fact that large temperature changes are observed from one season to another. 20 years in this respect is a long time. In some areas of the world hot, dry and windy periods are becoming more frequent and a turbine with the inventive control method may be able to withstand these changes, in particular the changes in the ambient temperature, because the component temperature may be controlled, even when the cooling system is design to small and is therefore running at its maximum cooling capacity. For instance, in conventional wind turbines, if e.g. the ambient temperature is predefined too low, over 20 years the conventional wind turbines would not be working for a long time period over a year because the ambient temperature would always exceed the predefined ambient temperature so that the wind turbines would be shut off oftentimes, so that the conventional wind turbines would stand still over a long time period in a year.

Moreover, the present invention makes it possible to run the wind turbine even in situations where the capacity of the cooling system is degraded due to a blockage of a filter due to insects, dust, etc. This is only possible when using the temperature of the component itself as input for the control strategy and controlling the component temperature besides the cooling system by the controlling of the output power. In a situation of filter blockage it would still be possible to keep the turbine running even if the capacity of the cooling system is reduced.

Statistical analyses of wind turbine operation sites show that the turbines has to operate at a combination of high temperature and high wind speeds at the same time relatively short times per year. Therefore, the benefit of using the cooling method could be used to either reduce the required cooling capacity of the cooling system and thus reducing the costs of the turbine or increasing the annularly energy production due to the adaption of the output power with respect to the component temperature without needing oversized cooling systems.

As used herein, reference to a computer program is intended to be equivalent to a reference to a program element and/or to a computer readable medium containing instructions for controlling a computer system to coordinate the performance of the above described method.

The computer program may be implemented as computer readable instruction code in any suitable programming language, such as, for example, JAVA, C++, and may be stored on a computerreadable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
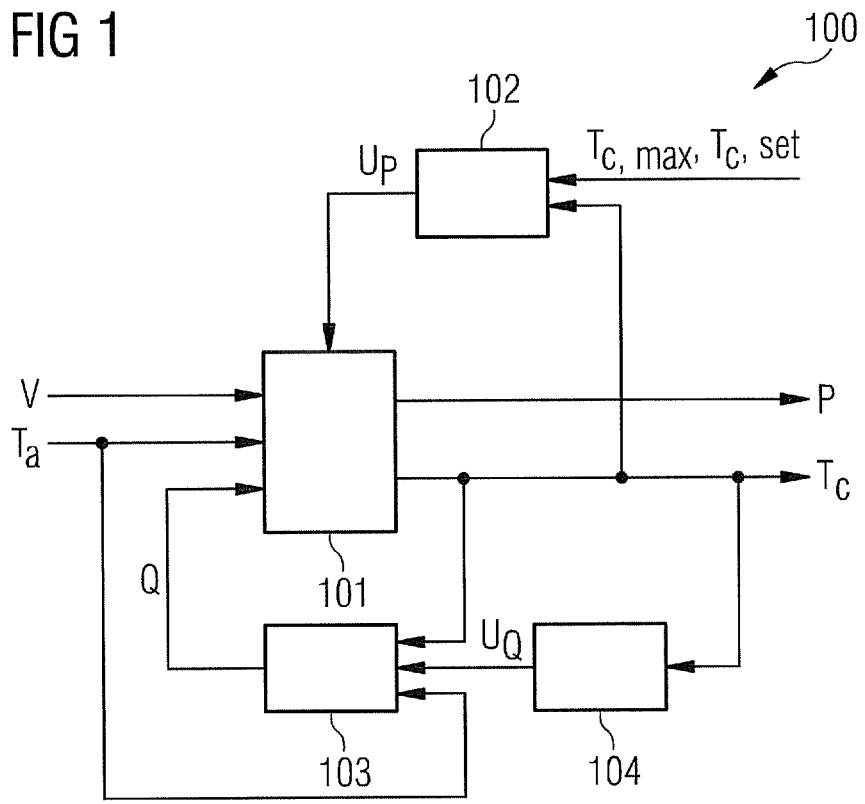
FIG. 1 illustrates a schematic view of an arrangement of a turbine component according to an exemplary embodiment of the present invention.

The illustrations in the drawings are schematic. It is noted that in different figures, similar or identical elements are provided with the same reference signs.

FIG. 1 shows a controlling device 100 for controlling a temperature of a component 101 of a wind turbine. The control device 100 comprises an input unit for defining a set point temperature Tc,set of the component 101 of the wind turbine. Moreover, the controlling device 100 comprises a determining unit for determining the actual temperature Tc of the component 101. The control device 100 comprises a comparing unit for comparing the defined set point temperature Tc,set with the determined actual temperature Tc. Moreover, the control unit 100 comprises a control unit for controlling the actual temperature Tc of the component 101 by controlling the output power P of the wind turbine based on the result of the comparing of the defined set point temperature Tc,set with the determined actual temperature Tc, so that the actual temperature Tc of the component 101 is kept below or constant at the set point temperature Tc,set of the component 101.

As can be seen in FIG. 1, a component controller 102 may receive as input parameters the defined set point temperature Tc,set and the actual temperature Tc of the component 101. The actual temperature Tc of the component 101 may be controlled by controlling the output power P of the wind turbine, so that the actual temperature Tc of the component 101 is kept below the set point temperature Tc,set of the component 101. As can be seen from FIG. 1, the component controller 102 may output a power control signal uP, e.g. by a comparison of the defined set point temperature Tc,set and the actual temperature Tc of the component 101, for controlling the operation of the component 101 and thus the temperature of the component 101.

The component 101 may comprise for instance a generator of a wind turbine, a gearbox of a wind turbine or other components where the power generation affects its component temperature. As can be taken from FIG. 1, the wind speed V and the ambient temperature Ta may influence the temperature Tc of the component 101 directly or indirectly (indirectly due to temperature change because of power production). Moreover, also other values may influence the actual temperature Tc of the component 101, such as dust particles or other blockade elements that blockades the coolers for instance.

Moreover, as can be taken from FIG. 1, a cooling system 103 may be provided that may be controlled by the cooling system controller 104. The cooling system 103 may provide a defined cooling power Q that may cool the actual component temperature Tc of the component 101.

The cooling power Q of the cooling system 103 may be defined by the formula:

$$Q = UA \cdot (Tc - Ta)$$

wherein UA is the thermal size of the cooling system, Tc the component temperature and Ta the ambient temperature of the surrounding air or other cooling mediums.

Conventional cooling systems of wind turbines are designed on the basis of a predefined maximum allowed ambient temperature Ta that is typical in the range between 35° C. to 40° C.

For a turbine running at full load, a maximum cooling power Qmax is defined taking into account the predefined maximum ambient temperature Ta,max. This input parameter induces a high required thermal size UA of the cooling system which is shown in the following formula:

$$UA = Q/(Tc - Ta)$$

Thus, for a high predefined ambient temperature and a high required cooling power Q, a large sized cooling system 103 has to be provided, so that the investment costs of the cooling system 103 are high in particular when the ambient temperature Ta gets close to the value of the component temperature Tc.

Furthermore, for more and high efficient wind turbines the temperatures Tc in the components 101 should be kept as low as possible in order to achieve low losses, such as electric current losses in the electric conductors in the components 101, e.g. in the generator. Also for modern generators with permanent magnets the magnet temperature should be kept low to a fault high efficiency, typically the magnetic temperature should be not exceeded Tc,max=60° C. to 80° C. Thus, nowadays there is a demand for low temperature gaps (defined by Tc−Ta).

Consequently, there is a demand for large cooling systems with large radiators, so that a large cooling system has to be installed in the nacelles of the wind turbines, so that also the costs of the wind turbines increase.

As an example, in a first exemplary the defined maximum ambient temperature Ta,max is defined by 35° C. and the maximum component temperature Tc,max or the set point temperature Tc,set is defined by 60° C. In a second exemplary the defined maximum ambient temperature Ta,max is increased from 35° C. to 40° C. and thus the required thermal size UA of the cooling system 103 has to be increased by 25%:

$$(Tc,\text{max}1 - Ta,\text{max}1):(Tc,\text{max}2 - Ta,\text{max}2) = (60-35):(60-40) = 1.25 = 25\%.$$

Until now, the problem has been solved by using relatively large cooling systems 103, so that a high maximum cooling power Qmax of the cooling system 103 may be provided. The temperature Tc of the components 101 depends for instance on the output power P, the wind speed V, the cooling power Q, the ambient temperature Ta, the ambient air pressure or a blockage of the coolers of the cooling system 103 by dust or insects.

In the design phase of a cooling system 103 the thermal size UA of the cooling system 103 is therefore defined by:

$$UA = Q\text{max}/(Tc,\text{max} - Ta,\text{max}),$$

wherein the maximum cooling power Qmax defines the maximum required cooling capacity normally at full load respectively under the generation of the maximum allowable output power Pmax and the maximum predefined ambient temperature Ta,max.

For safety reasons, most common practices is to shut off the wind turbine if the temperature in the component exceeds predetermined limits, i.e. when Tc>Tc,max.

This may in particular occur if the ambient temperature Ta is high and at the same time the wind turbine runs at full load for instance at high wind speeds V. Then, if the wind turbine is shut off due to high ambient temperatures Ta.

Because by conventional cooling methods, only the ambient air temperature Ta is taken as reference for shutting off the wind turbine, although the ambient air Ta does not tell anything about the temperature Tc of the components 101, the capacity of the cooling power Q of the cooling system 103 and furthermore the thermal time constant of the component 101, i.e. the time for heating up or cooling down the component 101 under certain ambient temperatures Ta.

Figure 2:
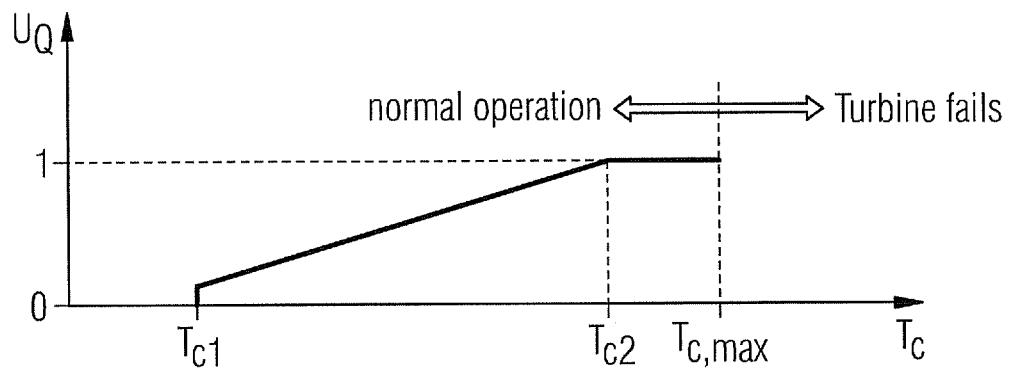
FIG. 2 illustrates a diagram of a cooling cycle of a cooling system according to an exemplary embodiment of the present invention.

FIG. 2 shows the cooling process in a diagram. On one axis the cooling control signal uQ is defined by a range between the value 0 and the value 1, wherein the value 0 defines that the cooling system 103 is off and the value 1 defines that the cooling system 103 runs with the maximum cooling power Qmax. The cooling system 103 may start to produce cooling power Q when a certain component temperature Tc1 is measured. By a temperature Tc2 the maximum cooling power Qmax of the cooling system 103 is produced and the cooling control signal uQ has the value 1. When the actual component temperature Tc further increases until a maximum allowable component temperature Tc,max, the turbine fails and has to be shut off.

Figure 3:
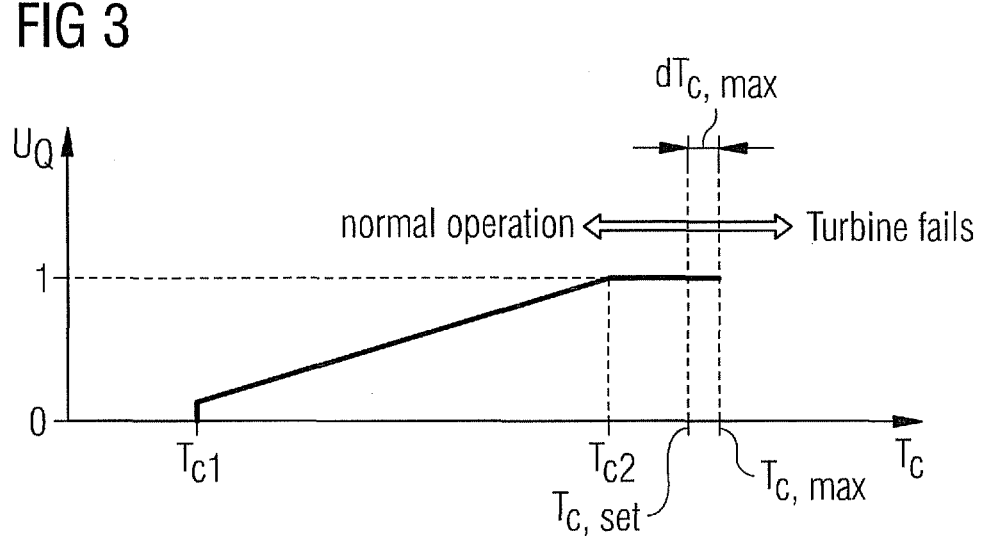
FIG. 3 illustrates a cooling diagram of a cooling control by controlling the output power according to an exemplary embodiment of the invention.

FIG. 3 shows an exemplary cooling cycle according to an exemplary embodiment of the present invention. When a certain component temperature Tc2 is reached, the full and the maximum cooling power Qmax of the cooling system 103 is required. By the present invention, a certain set point temperature Tc, set of the component 101 may be defined. The output power P may be controlled and in particular reduced until the temperature Tc of the component 101 falls below the predefined set point temperature Tc,set.

The set point temperature Tc, set of the component 101 may be defined by a predefined value below the maximum allowable component temperature Tc,max of the component in order to prevent an overrun of the maximum allowable component temperature Tc,maxm that could cause failures in the components 101. Thus, the set point temperature Tc,set may be defined by:

$$Tc,\text{set} = Tc,\text{max} - dTc,s$$

wherein dTc,s may define a certain safety temperature value, so that the set point temperature Tc,set is defined by a predefined amount below the maximum allowable component temperature Tc,max.

The safety temperature value dTc,s may defined for instance by 10° C., 5° C. or by 2° C. to 4° C.

Figure 4:
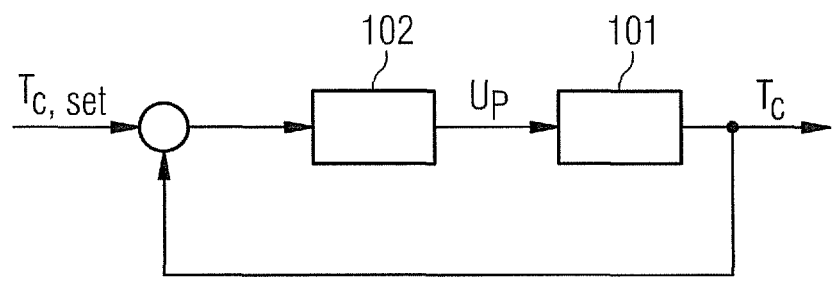
FIG. 4 shows a schematic view of a cooling control cycle by controlling the output power according to an exemplary embodiment of the present invention.

FIG. 4 shows schematically a cooling procedure according to an exemplary embodiment of the present invention. As shown in FIG. 4, a predefined set point temperature Tc,set is defined and may be compared to the actual component temperature Tc. On the basis of this comparison, the component controller 102 generates a power control signal uP that controls the component 101, in particular the output power P of the component 101. The power control signal uP may be defined by a value between 0 and 1, wherein the value 0 may denote no generation of output power P and the value 1 may denote 100% generation of output power Pmax. In certain sequences a further measurement of the component temperature Tc is accomplished and again compared to the set point temperature Tc,set. If the component temperature falls for instance below the set point temperature Tc,set, the component controller 102 may increase the output power P generation of the component 101. In a further measurement cycle, the actual component temperature Tc is compared again with the set point temperature Tc,set and a further power control signal uP is generated by the component controller 102. Thus, the power production of the output power P may permanently adapted to the actual component temperature Tc, so that always an optimum of output power P may be generated without overrunning the values for the maximum allowable component temperature Tc,max or the set point temperature Tc, set. In other words, by the claimed method of controlling the temperature of a component 101 always an optimum power production may be achieved without the need to shut off the complete power production of the wind turbine.

Compared to conventional systems, by the present invention the power production is only reduced a little when a high ambient temperature Ta and a high power generation of output power P is present at the same time, so that the maximum allowable component temperature Tc,max is not overrun.

In conventional systems, due to high ambient temperatures Ta and due to a high power production, the turbine would shut off until the ambient temperature Ta would fall below predefined values.

By the present invention the component temperature Tc is controlled by controlling the output power P. Calculations have shown that just a small power reduction of the output power P gives a relatively high component temperature Tc decreased.

In particular, wind turbines operate under quite dynamic outer circumstances, such as the ambient temperature Ta and wind speeds V. Moreover, each component 101 comprises a thermal time constant, that describe the time how fast the component 101 adapts the ambient temperature Ta. In other words, the thermal time constant defines a speed, how fast a component 101 may be heated up or cooled down. Thus, a predefined time period may be defined where the method allows that the actual component temperature Tc exceeds or differ to the defined set point temperature Tc,set until a controlling of the output power P is initiated.

Figure 5:
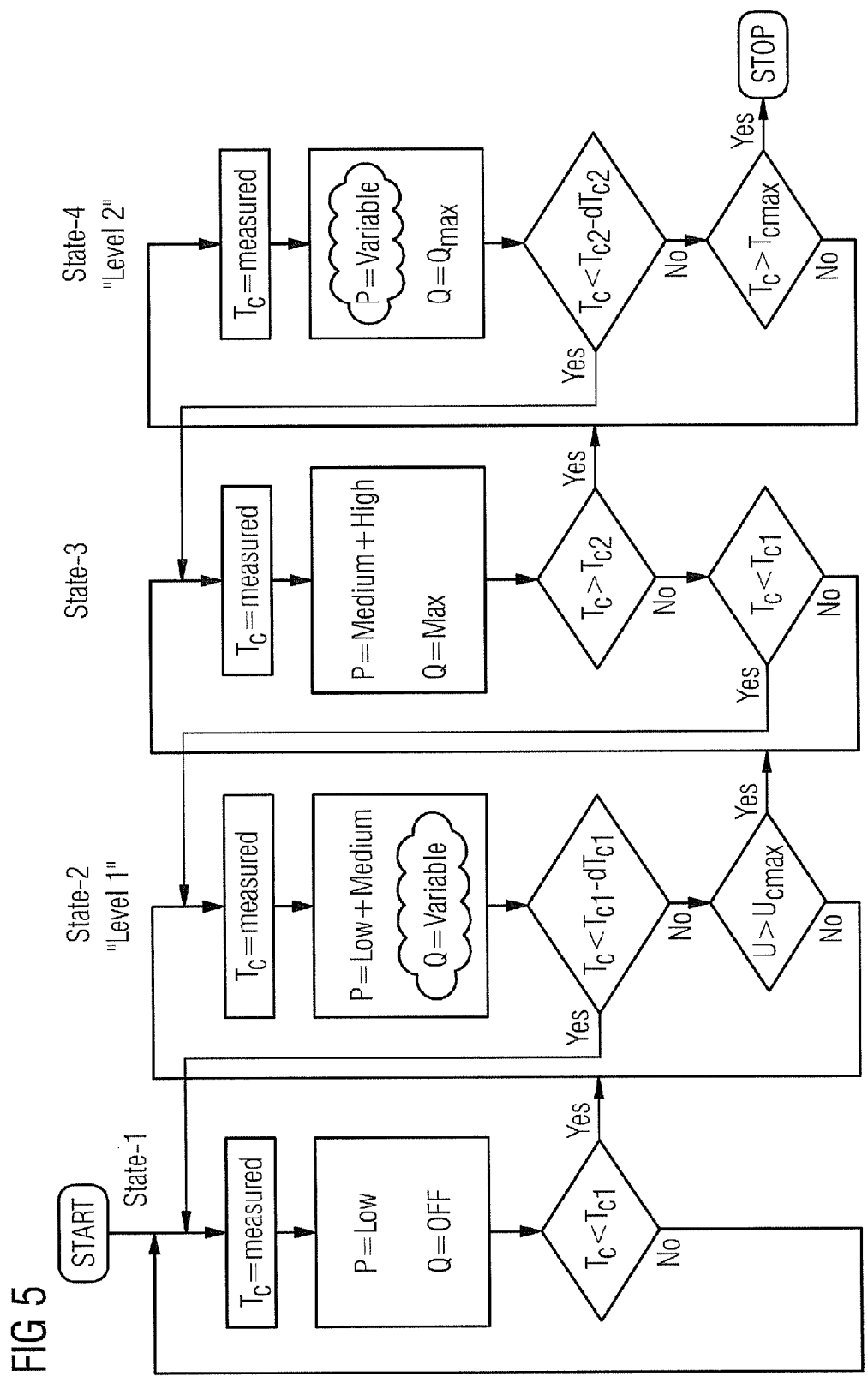
FIG. 5 shows a schematic view of different cooling states under different cooling conditions according to an exemplary embodiment of the present invention.

FIG. 5 shows four exemplary states of cooling procedures of a wind turbine. At the beginning, the component temperature Tc may be measured during a low output power P and a shut off cooling system 103. When the component temperature Tc exceeds a defined first component temperature Tc1, the cooling system is activated. In state 2, a low or medium power production exists, wherein the cooling power Q may be variable depending on the component temperature Tc. When the temperature of the component Tc falls under the first component temperature Tc1 for a certain predefined time period dTc1, the cooling system 103 is shut off again. In state 3, the cooling system produces cooling power Q until a maximum cooling power Qmax is needed. If the maximum cooling power Qmax of the system is reached, the output power P is high and the component temperature Tc exceeds a predefined second component temperature Tc2, state 4 is initiated.

In state 4, the maximum cooling power Qmax is produced, wherein the cooling of the component is controlled by the adjustment of the power production P.

In conventional wind turbines, in stage 4 the wind turbine is shut off in order to cool down the components, wherein the shutoff of the component is depending on the ambient temperature Ta.

In state 4, according to the present invention, the component temperature Tc is measured and the output power P is adjusted with respect to the component temperature Tc. When the component temperature Tc falls below the second component temperature Tc2 for a certain predefined time dTc, the procedure under state 3 is initiated again. If the component temperature Tc exceeds even with a controlled output power P a predefined maximum component temperature Tmax, the component 101 respectively the wind turbine may be shut off in order to provide an overheating.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS 100 control device
101 component
102 component controller
103 cooling system
104 cooling system controller
Tc temperature of the component
Tc,set set point temperature of the component
Tc,max maximum allowable component temperature
dTc,s safety temperature value
Ta ambient temperature
Ta,max maximum ambient temperature
P output power
Pmax maximum allowable output power
uP power control signal
uQ cooling control signal
Q cooling power
Qmax maximum cooling power of the system
V wind speed

The invention claimed is:

1. A method of controlling a temperature of a component of a wind turbine, the method comprising:
defining a set point temperature of the component of the wind turbine;
determining an actual temperature of the component;
comparing the defined set point temperature and the determined actual temperature;
controlling the actual temperature of the component by controlling an output power of the wind turbine based on a result of comparing the defined set point temperature and the determined actual temperature,
wherein controlling of the actual temperature of the component further comprises controlling a cooling power of a cooling system by a cooling control signal,
wherein the cooling control signal is indicative of the actual temperature of the component, wherein controlling the cooling power of the cooling system by the cooling control signal is carried out until a maximum cooling power is reached, and wherein controlling the output power of the wind turbine is carried out if the cooling system is operated with a maximum cooling power.

2. The method of claim 1, further comprising:
defining a maximum allowable output power of the wind turbine;
determining an actual output power; and
comparing the defined allowable output power and the determined actual output power,
wherein controlling the actual output power further comprises taking into account a result of comparing the defined allowable output power and the determined actual output power.

3. The method of claim 1,
wherein the component is selected from the group consisting of a generator of the wind turbine and a gearbox of the wind turbine.

4. The method of the claim 1,
wherein controlling the output power of the wind turbine comprises pitching a rotor blade of the wind turbine.

5. The method of the claim 1,
wherein controlling the output power of the wind turbine comprises generating a power control signal for controlling an operation of the component,
wherein the power control signal is indicative for a result of comparing the determined actual temperature and the determined set point temperature.

6. The method of one of the claim 1,
wherein controlling the output power of the wind turbine is carried out when the actual temperature has differed to the set point temperature for a predefined time period.

7. The method of one of the claim 1,
wherein the set point temperature is defined by a maximum allowable component temperature minus a predetermined safety temperature value.

8. The method of claim 1,
wherein determining the actual temperature of the component comprises measuring a cooling fluid temperature of the cooling system, and
wherein the cooling fluid temperature is indicative of the actual temperature of the component.

9. The method of claim 1,
wherein the actual temperature of the component is kept constant by controlling the cooling power of the cooling system by the cooling control signal until a maximum cooling power is reached, and
wherein the actual temperature of the component is kept constant by controlling the output power of the wind turbine if the cooling system is operated with a maximum cooling power.

10. A controlling device for controlling a temperature of a component of a wind turbine, the controlling device comprising:
an input unit for defining a set point temperature of the component of the wind turbine;
a determining unit for determining the actual temperature of the component;
a comparing unit for the defined set point temperature and the determined actual temperature; and
a cooling system; and
a control unit for controlling the actual temperature of the component by controlling the output power of the wind turbine based on the result of comparing the defined set point temperature and the determined actual temperature and by controlling a cooling power of the cooling system by a cooling control signal,
wherein the cooling control signal is indicative of the actual temperature of the component,
wherein the control unit carries out the controlling of the cooling power of the cooling system by the cooling control signal until a maximum cooling power is reached, and
wherein the control unit carries out the controlling of the output power of the wind turbine if the cooling system is operated with a maximum cooling power.

11. A wind turbine comprising:
a component; and
a controlling device according to claim 10;
wherein the controlling device is adapted for controlling the temperature of the component.

* * * * *